United States Patent [19]
Schoenberg et al.

[11] Patent Number: 6,150,468
[45] Date of Patent: Nov. 21, 2000

[54] WATER SOLUBLE AMPHIPHILIC HETERATOM STAR POLYMERS AND THEIR USE AS EMULSION STABILIZERS IN EMULSION POLYMERIZATION

[75] Inventors: Jules E. Schoenberg, Plano, Tex.;
Robert D. Harlan, Somerville, N.J.;
Grant T. Shouldice, Peapack, N.J.;
Paul M. Petersen, Princeton, N.J.

[73] Assignee: National Starch and Chemical Investment Holding Corporation, Wilmington, Del.

[21] Appl. No.: 09/190,527

[22] Filed: Nov. 12, 1998

[51] Int. Cl.[7] .............................. C08L 33/04; C08L 35/02
[52] U.S. Cl. ............................................. 525/222
[58] Field of Search .............................. 525/222

[56] References Cited

U.S. PATENT DOCUMENTS

| | | |
|---|---|---|
| 3,364,182 | 1/1968 | Griffith . |
| 3,769,254 | 10/1973 | Anderson et al. . |
| 5,391,406 | 2/1995 | Ramharack et al. ............... 427/516 |
| 5,399,642 | 3/1995 | Emmons et al. ............... 526/224 |
| 5,416,127 | 5/1995 | Chandran et al. ............... 522/149 |
| 5,489,397 | 2/1996 | Bainbridge ............... 252/174.24 |
| 5,492,965 | 2/1996 | Emmons et al. ............... 524/833 |
| 5,498,675 | 3/1996 | Emmons et al. ............... 525/537 |
| 5,536,759 | 7/1996 | Ramharack et al. ............... 522/35 |
| 5,574,117 | 11/1996 | Yoshida et al. ............... 526/224 |
| 5,679,762 | 10/1997 | Yoshida et al. ............... 528/364 |
| B1 3,769,254 | 2/1985 | Anderson et al. ............... 524/398 |

FOREIGN PATENT DOCUMENTS

| | | |
|---|---|---|
| 0 448 224 A1 | 9/1991 | European Pat. Off. . |
| 0 449 413 A1 | 10/1991 | European Pat. Off. . |
| 0 541 272 A1 | 5/1993 | European Pat. Off. . |
| 1645232 | 11/1966 | Germany . |
| 9-53059 | 2/1997 | Japan . |
| 2 294 467 | 5/1996 | United Kingdom . |
| WO 96/37520 | 11/1996 | WIPO . |

OTHER PUBLICATIONS

Schaefgen and Flory, "Synthesis of Multichain Polymers and Investigation of their Viscosities", JACS, Aug. 1948, vol. 709, pp. 2709–2718.

Morton, Helminiak, Gadkary and Bueche, Preparation and Properties of Monodisperse Branched Polystyrene, *Journal of Polymer Science*, vol. 57, pp. 471–482 (1962).

Jérome and Teyssié, Star–Shaped Block Copolymers. IV. Emulsifying Activity in the Water–Oil Emulsions, , *Journal of Applied Polymer Science*, vol. 26, 343–351 (1981).

Yuan and Di Silvestro, "Polymerization of methyl methacrylate in the presence of polyfunctional chain transfer agents", Macromol. Chem. Phys. 196, 2905–2913 (1995).

Erickson, Zimmermann, Southwick and Kiibler, "Liquid Reactive Polymers for Radiation Curable High Performance PSAs", *Adhesives Age*, Nov. 1995.

Puts and Sogah, "Universal Multifunctional Initiator Containing Orthogonal Reactive Sites . . . " *Macromolecules* 1997, 30, 7501–7055.

Ullisch and Burchard, "Branching in Free Radical Polymerization Due to Chain Transfer . . . ", *Makromol. Chem.*, 178, 1427–1437 (1977).

European Coatings Journal, vol. 1–2/98, p. 87. 1998.

Gia et al., "Star–shaped block copolymers. II. Microemulsions stabilizers", Colloid & Polymer Science 257, 1294–1296 (1979).

*Primary Examiner*—Nathan M. Nutter
*Attorney, Agent, or Firm*—Thomas F. Roland, Esq.

[57] ABSTRACT

The present invention is directed to amphiphilic star polymers and their use as emulsion stabilizers in emulsion polymerization.

5 Claims, No Drawings

WATER SOLUBLE AMPHIPHILIC HETEROATOM STAR POLYMERS AND THEIR USE AS EMULSION STABILIZERS IN EMULSION POLYMERIZATION

BACKGROUND OF THE INVENTION

Star-branched polymers, also known as radial polymers, are characterized by having three or more polymer arms emanating from a central core. These polymers can be prepared by various polymerization procedures such as anionic, cationic, and free radical mechanisms. The stars are usually formed by using either multifunctional initiators, multifunctional chain transfer agents, or multifunctional coupling agents. The star polymers have unique properties including: narrow molecular weight distributions; low viscosities at low molecular weights or in solution due to their compact structures; and high viscosities at high molecular weights due to extensive entanglements.

The present invention is directed to amphiphilic star polymers which are effective as stabilizers of emulsion polymerization reactions as well as stabilizers of the emulsion polymer.

SUMMARY OF THE INVENTION

The present invention is directed to amphiphilic star polymers, specifically, star-shaped polymers having both hydrophilic and hydrophobic arms. The star polymers of the present invention comprise at least three arms, wherein at least one arm is a hydrophobic moiety and the remaining arms are hydrophilic.

The present invention is also directed to the use of amphiphilic star polymers as emulsion stabilizers in emulsion polymerization.

DETAILED DESCRIPTION OF THE INVENTION

The present invention is directed to star polymers and their use as emulsion stabilizers in emulsion polymerization.

The amphiphilic star polymers of the present invention comprise a central core and three or more polymer arms which extend radially from the core. Specifically, the present invention is directed to star polymers which comprise a mercaptan core from which radiate at least three polymer arms, wherein at least one arm is a hydrophobic moiety and the remaining arms are hydrophilic.

The amphiphilic star polymers of the present invention comprise a polyvalent mercaptan core and three or more polymer arms which extend radially from the core. The compositions of the arms themselves may be random, blocks or homopolymers.

The polyvalent mercaptan core of the present invention comprises three or more thiol groups, wherein at least two of the thiol groups are of different reactivities, such that the core is of differential reactivity or heterocore. It is at the thiol groups that the monomers will react to create the polymer arms of the star polymer. Cores comprising thiol groups, all of which are of the same composition and reactivity will be referred to as homocores.

Specifically, the polyvalent mercaptan core comprises a central component, derived from a multifunctional alcohol which has been substituted with thiol derivatives. The multifunctional alcohol can have any number of functional hydroxy units, preferably 3 to 8 functional units. To prepare the core of the present invention, each of the OH functional units will be substituted with thiol units, preferably at least 2 of which are of different compositions.

In one embodiment of the present invention, the polyvalent mercaptan core is of the general formula:

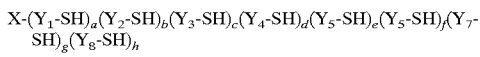

or one of the following specific embodiments:

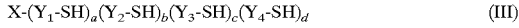

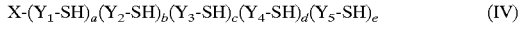

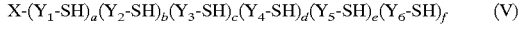

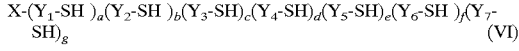

or

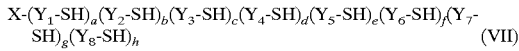

wherein X is derived from an organic radical having a valence of 3 to 8. Preferably, X is derived from a tri- to octa-multi-functional alcohol such as glycerol, sorbitol, trimethylolpropane, pentaerythritol, dipentaerythritol, tripentaerythritol, and inositol.

Variables $Y_1$, $Y_2$, $Y_3$, $Y_4$, $Y_5$, $Y_6$, $Y_7$ and $Y_8$ are the same or different and each comprises $C_{2-10}$ alkanoic acids, preferably $C_{2-6}$ alkanoic acids. Variables a and b are integers from 1–8 and variables c, d, e, f, g and h are integers from 0 to 8, provided that $a+b+c+d+e+f+g+h \leq 8$.

Each of the above identified (Y-SH) units are derived from, for example, 2-mercaptoacetic acid, 2-mercaptopropionic acid, 3-mercaptopropionic acid, 4-mercaptobutyric acid, 5-mercaptopentanoic acid, or 6-mercaptohexanoic acid. Preferred are 2-mercaptopropionic acid and 3-mercaptopropionic acid.

Examples of cores of differential reactivity within the scope of the present invention include pentaerythritol bis(3-mercaptopropionate) bis(2-mercapto-propionate); trimethylolpropane bis(3-mercaptopropionate)-(2-mercapto-propionate); pentaerythritol tris(3-mercaptopropionate)(2-mercaptopropionate); and trimethylolpropane bis(2-mercaptopropionate)(3-mercaptopropionate).

For comparison, cores of non-differential reactivity, or homocores, include pentaerythriol tetrakis(3-mercaptopropionate), trimethylolpropane trithiopropionate, tri(3-mercaptopropionate), pentaerythritol tetrakis (thioglycolate) and dipentaerythritol hexakis (thioglycolate).

In general, the polyvalent mercaptan core is prepared by reacting a multi-functional alcohol with the appropriate amount of mercapto acid to prepare the polyvalent mercaptan core. For example, if the multifunctional alcohol is a tri-alcohol, three equivalents of mercapto acid are added to give three (HS-Y) units. The three equivalents of mercapto acid can be made up of any combination of the preferred mercapto acids. For example, one equivalent of 2-mercaptopropionic acid (a secondary thiol-containing acid) and two equivalents of 3-mercaptopropionic acid (a primary thiol-containing acid) will provide a core of differential reactivity.

In a specific example, pentaerythritol can be used as the multifunctional alcohol, X, used to prepare the core. To pentaerythritol is added 2 mole equivalents each of a primary thiol, 3-mercaptopropionic acid, and a secondary thiol, 2-mercaptopropionic acid. The result will be a mixture of five compounds corresponding to molecules containing ratios of primary/secondary SH groups of 0/4, 1/3, 2/2, 3/1, and 4/0. Those cores with ratios of 1/3, 2/2 and 3/1 are cores of differential reactivity and are within the scope of the present invention. The cores with ratios of 0/4 and 4/0 are homocores. The product mixture, though a statistical mixture, has cores with an average of two primary thiol groups and two secondary thiol groups per core as shown by the following reaction:

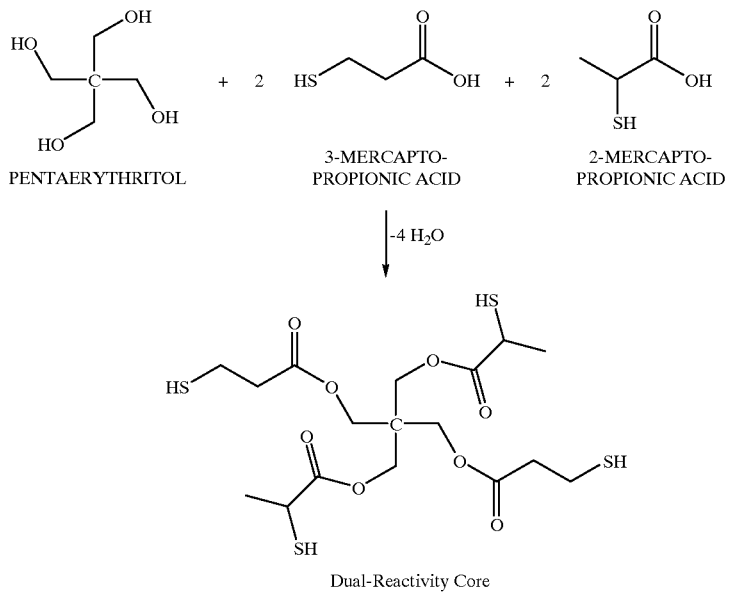

Dual-Reactivity Core

With dipentaerythritol, seven possible compounds can be obtained corresponding to 0,1,2,3,4,5 and 6 primary SH groups per molecule. These differential thiols will be utilized to provide enhanced selectivity to generate heteroarm stars.

For comparison, a homocore can be prepared by adding 4 mole equivalents of thiol can be added to pentaerythritol to prepare a homocore:

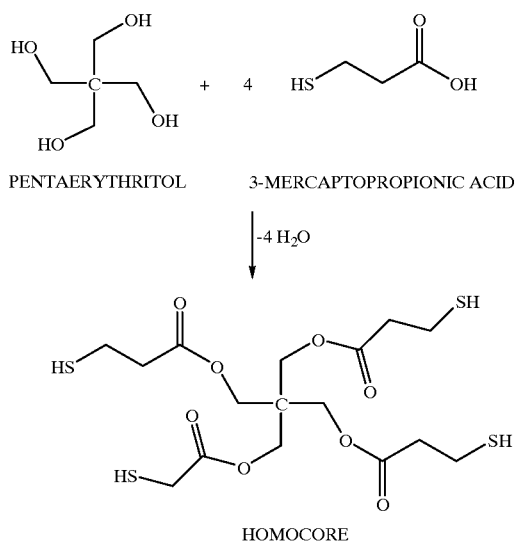

HOMOCORE

The star polymers of the present invention are formed using the mercaptan core as a chain transfer agent in polymerization processes which include bulk, solution, emulsion, and suspension polymerization. Preferably the process is a solution polymerization process employing a free radical initiator. The polymerization reaction is typically conducted at temperatures in the range of 10 to 120° C., preferably 70 to 100° C.

The present invention contemplates that the resulting polymer may comprise arms that are all different, or some different, or all the same after the S atom but with different Y connecting groups.

In one embodiment, the preparation of the star polymers of the present invention is by the non-sequential addition of monomers to a core of differential reactivity. During the process of this embodiment, all of the monomers are added at the same time, i.e., a mixture of two or more monomers are added to the core. The monomers with the higher reactivity ratios in copolymerization will react with the most reactive thiol groups. The polymerization is initiated by a mercapto group on the polyvalent mercaptan core.

In another embodiment, the preparation of the star polymers is by sequential addition of the monomer to the core of differential reactivity. The monomer that is added first will tend to react with the more reactive SH groups. It is preferred that such monomers have a chain transfer constant close to one, i.e., acrylates and methacrylates. The monomers added next will react with the less reactive SH groups. In general, the orders of reactivity of thiol groups are: SH groups attached to aromatic rings (i.e., thiophenols) are more reactive than SH groups attached to primary aliphatic carbon atoms which are more reactive than SH groups attached to secondary aliphatic carbon atoms, i.e., $ArSH > RCH_2SH > RR'CHSH$.

In the process of the above embodiment the polyvalent mercaptan and a first polymerizable unsaturated monomer mixture are radically polymerized. The first monomer mixture could be a single monomer or a mixture of two or more monomers. This polymerization is initiated by a mercapto group on the polyvalent mercaptan core via a standard chain transfer reaction. Because the polyvalent mercaptan group comprises thiol groups of different reactivities, these first monomers will preferably react with the most reactive thiols. The next step comprises the addition of a second polymerizable unsaturated monomer mixture to the product from the first radical polymerization. The second monomer mixture, which may or may not be different from the first unsaturated monomer mixture, is then radically polymerized with the polyvalent mercaptan core. Again because of the different reactivities of the thiol groups on the core, the second monomers will preferably react with the thiol groups of second order of reactivity. This process can be repeated with third, fourth, etc., monomers until all of the thiol groups are reacted. Because of the differences in reactivity of the thiol there is a great deal of control of the blockiness of the final polymer. As used herein, blockiness indicates that the arms of the polymer differ in composition from one arm to the next. The first arms formed are those emanating from the most reactive thiols, the next arms from the next most reactive, etc. Hence greater selectivity, which translates into better control of the heteroness of the polymer, results as compared to the method of U.S. Pat. No. 5,679,762.

In any of the above embodiments, the monomer mixtures can be added by any method familiar to the skilled artisan including dropwise or by slug dose.

Monomers which may be used to prepare the polymer arms of the star polymers of the present invention include ethylenically unsaturated monomers selected from the group consisting of acrylic and methacrylic acids, acrylamide and methacrylamide, acrylonitrile and methacrylonitrile, alkoxyalkyl acrylamides and methacrylamides, e.g., butoxymethyl acrylamide and methoxymethyl methacrylamide, hydroxyalkyl acrylamides and methacrylamides, e.g., N-methylol acrylamide and methacrylamide, the metal salts of acrylic and methacrylic acids, and the esters of acrylic and methacrylic acids with alcohols and phenols; the vinyl aromatic compounds, e.g., styrene, alpha -methylstyrene and substituted derivatives thereof such as the halogenated derivatives thereof and vinyl toluene; the vinyl esters; vinyl amides, e.g., vinyl acetate and vinyl pyrrolidone; and ethylenically unsaturated nitriles.

Monomers may be selected from hydroxyalkyl esters of ethylenically unsaturated carboxylic acids, ethylenically unsaturated carboxylic acids, ethylenically unsaturated epoxides, ethylenically unsaturated isocyanates and combinations thereof.

Other unsaturated monomers include hydroxypropyl (meth) acrylate, glycidyl (meth)acrylate, methoxyethyl (meth) acrylate, ethoxyethyl (meth)acrylate, ethoxyethoxyethyl (meth)acrylate, and the like; vinyl ethers which are represented by methyl vinyl ether, ethyl vinyl ether, isobutyl vinyl ether, and the like; fumaric acid, monoalkyl fumarates, dialkyl fumarates; maleic acid, monoalkyl maleates, dialkyl maleates; itaconic acid, monoalkyl itaconates, dialkyl itaconates; half esters of succinic anhydride or phthalic anhydride with hydroxyethyl (meth)acrylate; (meth)acrylonitrile, butadiene, isoprene, vinyl chloride, vinylidene chloride, vinyl ketones, vinyl pyridine, vinyl carbazole, and the like. These compounds may be used either alone or in combinations with each other.

The present invention also contemplates the use of multifunctional monomers such as ethylene glycol di(meth) acrylate, trimethylolpropane tri(meth)acrylate, diethylene glycol di(meth)acrylate trisacrylate, divinyl benzene, triallyl cyanurate, allyl acrylate, diallyl phthalate, diallyl sucrose. The preferred monomers are acrylic acid and methacrylic acid and derivatives such as esters and amides which have chain transfer constants with thiols that are close to one. Examples of such monomers are of the formula

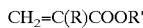

where R is H or methyl and R' is H or $C_{1-12}$ alkyl, $C_{5-10}$ cycloalkyl or $C_{6-10}$ aryl wherein the alkyl, cycloalkyl or aryl is optionally substituted with halo or hydroxy. Examples of such monomers include acrylic and methacrylic acid and esters of acrylic acid and methacrylic acid such as methyl acrylate, ethyl acrylate, n-butyl acrylate, 2-ethylhexyl acrylate, 2-hydroxyethyl acrylate, hydroxypropyl acrylate, isobornyl acrylate, methyl methacrylate, ethyl methacrylate, n-propyl methacrylate, isopropyl methacrylate, n-butyl methacrylate, isobutyl methacrylate, cyclohexyl methacrylate, isobornyl methacrylate, 2-ethylhexyl methacrylate, benzyl methacrylate, phenyl methacrylate, hydroxyethyl methacrylate and hydroxypropyl methacrylate. Also included are the $C_{1-8}$ alkyl esters of methacrylic acid.

Methyl methacrylate ("MMA"), 2-ethylhexyl acrylate ("EHA"), methyl acrylate ("MA"), acrylic acid ("AA"), methacrylic acid ("MMA"), butyl methacrylate ("BMA"), 2-hydroxyethyl acrylate ("2-EHA") and butyl acrylate ("BA") are the most preferred monomers. Acrylic and methacrylic acid and their respective metal salts are the preferred monomers for the hydrophilic segments or polymer arms. The preferred monomers for the hydrophobic polymer segments or polymer arms are the esters of acrylic and methacrylic acid.

At least one of the monomers used to prepare the arms of the star polymer must be a compatible vinyl monomer. Such monomers are those containing a functional group such as a hydroxyl, amide, amine or carboxylic group.

When the polymer arm is prepared from acrylic and methacrylic monomer units, the polymer arm of the resulting polymer comprises 10 to 1500 monomer units, preferably 20 to 500. When a mixture of monomers is used, the copolymer may be a block or random copolymer of such units. Preferably the copolymer is a random copolymer as produced through conventional free radical polymerization.

Free radical initiators suitable for use in the polymerization process include, for example: azo-based polymerization initiators such as 2,2'-azobis-isobutyronitrile ("AIBN") and 2,2'-azobis(cyclohexanecarbonitrile); peroxide-based polymerization initiators such as benzoyl peroxide; and the like. Other suitable initiators include organic peroxides, hydroperoxides, persulfates and azo compounds such as methyl ethyl ketone peroxide, cumene hydroperoxide, potassium persulfate, lauroyl peroxide, 2,5-dimethyl-2,5-di (t-butylperoxy)hexane, diethyl peroxide, dipropyl peroxide, dilauryl peroxide, dioleyl peroxide, distearyl peroxide, di(tertiary butyl) peroxide, di(tertiary amyl) peroxide, tertiary butyl hydroperoxide, tertiary amyl peroxide, acetyl peroxide, propionyl peroxide, lauroyl peroxide, stearoyl peroxide, malonyl peroxide, succinyl peroxide, phthaloyl peroxide, acetyl benzoyl peroxide, propionyl benzoyl peroxide, ascaridole, ammonium persulfate, sodium persulfate, sodium percarbonate, potassium percarbonate, sodium perborate, potassium perborate, sodium perphosphate, potassium perphosphate, tetralin hydroperoxide, tertiary butyl diperphthalate, tertiary butyl perbenzoate, 2,4-dichlorobenzoyl peroxide, urea peroxide, caprylyl peroxide, p-chlorobenzoyl peroxide, 2,2-bis (tertiary butyl peroxy)butane, hydroxyheptyl peroxide.

Whether or not the reaction will require a solvent will depend on the monomers and core selected. If the polymerization process is one which requires a solvent, as determined by one of skill in the art, a solvent can be selected from the group consisting of organic solvents which are represented by: aromatic hydrocarbons such as toluene and xylene; esters such as ethyl acetate and butyl acetate; cycloaliphatic hydrocarbons such as cyclohexane; aliphatic hydrocarbons such as hexane and pentane; ketones such as acetone, methyl ethyl ketone, and methyl isobutyl ketone; aliphatic esters; alcohols; and the like. Other suitable solvents include naphthalene, trichlorobenzene, dimethylformamide, dimethylacetamide and water.

The present invention is also directed to the use of amphiphilic polymers as emulsion stabilizers in emulsion polymerization. It is well known to those skilled in the art of free radical emulsion polymerization that emulsion polymers which are stable to coagulation, flocculation or sedimentation are generated in the presence of surface active and/or stabilizing moieties. Exemplary conventional stabilizing moieties include charged groups generated from the decomposition of water soluble free radical initiators such as sodium persulfate, anionic surfactants such as sodium lauryl sulfate, cationic surfactant such as cetyl pyridinium chloride, non-ionic surfactants such as nonylphenol ethoxylate, or protective colloids such as poly(vinyl alcohol), hydroxyethyl cellulose and block copolymers of poly(ethylene oxide) and poly(propylene oxide).

The present invention relates to an amphiphilic heteroarm star polymer stabilized aqueous emulsion composition comprising (a) from about 10% to 80% by weight of a polymer derived from an emulsion polymerizable ethylenically unsaturated monomer or monomers; (b) from about 0.1 to 20% by weight of an amphiphilic heteroarm star polymer; (c) from about 0.01% to 1% by weight of a free radical polymerization initiating agent; and (d) the remainder water and optionally a buffering agent such as sodium acetate or ammonium hydroxide. Preferred star polymers are water soluble or water compatible. Suitable polymerizable ethylenically unsaturated monomers include vinyl ester monomers such as vinyl acetate, vinyl propionate, vinyl neononanoate, vinyl neodecanate, vinyl 2-ethyl hexanoate, vinyl pivalate, vinyl versatate and mixtures thereof. Other suitable polymerizable ethylenically unsaturated monomers include alkyl (meth) acrylate monomers including methyl acrylate, ethyl acrylate, butyl acrylate, 2-ethylhexyl acrylate, lauryl acrylate, methyl methacrylate and mixtures thereof. Other suitable polymerizable ethylenically unsaturated monomers include monoethylenically unsaturated carboxylic acid monomers including acrylic acid, methacrylic acid, itaconic acid, crotonic acid, fumaric acid, maleic anhydride and mixture thereof. Other suitable polymerizable ethylenically monomers include styrene, butadiene, acrylonitrile, acrylamide, N-methylol acrylamide, di-butyl maleate, ethylene, vinyl chloride and mixtures thereof. Preferred ethylenically unsaturated monomers include styrene, butadiene, vinyl acetate, methyl acrylate, methyl methacrylate, ethyl acrylate, butyl acrylate, 2-ethylhexyl acrylate, acrylonitrile, acrylamide, t-octyl acrylamide N-vinyl formamide, N-vinyl acetamide, N-vinyl pyrolidone and ethylene. In a preferred embodiment, the amount of polymer derived from an emulsion polymerization of ethylenically unsaturated monomer in the amphiphilic heteroarm star polymer stabilized emulsion polymerization is present in an amount from about 10% to 80%, preferably from about 25% to 75% and more preferably from about 30% to 75% by weight.

The amphiphilic heteroarm star polymer stabilizer may be selected from the group consisting of the star polymers of the present invention, mixtures of star polymers of the present invention, or mixtures of amphiphilic heteroarm star polymer stabilizers and conventional stabilizers known to those who practice the art of emulsion polymerization. The amount of amphiphilic heteroarm star polymer stabilizer in the aqueous emulsion polymerization composition of ethylenically unsaturated monomers may vary depending upon the particular water soluble amphiphilic heteroarm star polymer stabilizer employed, the particular composition of ethylenically unsaturated monomers employed, the polymerization reaction conditions and the final emulsion characteristics including but not limited to average particle size, particle size distribution, solid content, pH and viscosity. In general, the amount of amphiphilic heteroarm star polymer stabilizer employed will be an effective amount to emulsify and stabilize the polymerization composition. In a preferred embodiment, the amphiphilic heteroarm star polymer stabilizer is utilized in an amount from about 0.1% to 20%, preferably from about 0.2% to 10% and more preferably from about 1% to about 5% by weight.

Suitable free radical emulsion polymerization initiating agents are well known to those who practice the art of emulsion polymerization and include but are not limited to peroxides, hydroperoxides, persulfates, and azo compounds such as hydrogen peroxide, benzoyl peroxide, t-butyl peroxide, cumene peroxide, t-butyl perbenzoate, t-butyl diperphthalate, methyl ethyl ketone peroxide, ammonium persulfate, sodium persulfate, potassium persulfate, 2,2'-azobisisobutronitrile ("AIBN") and mixtures thereof, as well as cerium, manganese and vanadium catalyzed systems and also other systems such as those catalyzed by irradiation. Thermal conditions or redox conditions using a reductant such as sodium formaldehyde sulfoxylate, isoascorbic acid, Iron (II) or sodium bisulfite may be used to promote the decomposition of free radical generating species. The amount of free radical emulsion polymerization initiating agent present in the amphiphilic heteroarm star polymer stabilized emulsion polymerization composition may vary depending on the particular composition of ethylenically unsaturated monomers employed and the polymerization reaction conditions desired. In general, the amount of free radical polymerization initiating agent will be an amount effective to obtain the desired polymerization composition. In a preferred embodiment the free radical emulsion polymerization initiating agent in the amphiphilic heteroarm star polymer stabilized emulsion polymerization composition is present in an amount from about 0.01% to about 1%, preferably from about 0.02% to 0.5% and more preferably from about 0.05% to about 0.3%.

Applications of amphiphilic heteroarm star polymer stabilized aqueous emulsion compositions include but are not limited to adhesives, coatings, binders, fixatives, sizes for use in glass, paper and textile applications as well as personal care products.

The following examples are illustrative only and are not intended to limit the scope of the present invention in any manner.

EXAMPLES

The following test procedures were used in the examples:

Solution viscosities were determined on a Brookfield Model RVT viscometer operated at 25 rpm and 22° C.

Surface tension was measured by a Krüss BP2 bubble tensiometer.

Example I

Preparation of an Octa-Functional Core of Differential Reactivity

An octa-functional polymercaptan core with differential reactivity in accordance with the present invention was prepared in the following manner. To a one liter flask was added 75.00 grams of tripentaerythritol (0.2 mol; 1.6 moles hydroxy groups), 94.29 grams of 2-mercaptopropionic acid (0.89 mol, 0.55 equivalents), 94.29 grams of 3-mercaptopropionic acid (0.89 mol, 0.55 equivalents) and 300 grams of toluene. A catalyst solution prepared from 0.75 grams of p-toluene sulfonic acid in 1 ml of water was added in a single shot. The mixture was stirred and heated to reflux, 115° C. The reaction was driven by azeotropic removal of water using a Dean-Stark apparatus. Heating was discontinued once the theoretical amount of water had been removed. In this case, 29 ml of water was collected. After the reaction is complete, excess mercapto acid was neutralized with $NaHCO_3$. The solvent was then removed under vacuum to yield the multi-reactivity polymercaptan core.

Example II

Preparation of a Tetra-Functional Core of Differential Reactivity

A tetra-functional polymercaptan core with differential reactivity in accordance with the present invention was prepared in the following manner. To a two liter flask was added 68.1 grams of pentaerythritol (0.5 mol, 2 moles hydroxy groups), 116.8 grams of 2-mercaptopropionic acid (1.1 mol, 0.55 equivalents), 116.8 grams of 3-mercaptopropionic acid (1.1 mol, 0.55 equivalents) and 250 grams of toluene. A catalyst solution prepared from 1.5 grams of p-toluene sulfonic acid in 2 ml of water was added in a single shot. The mixture was stirred and heated to reflux, 115° C. The reaction was driven by azeotropic removal of water using a Dean-Stark apparatus. Heating was discontinued once the theoretical amount of water had been removed. In this case, 38 ml of water was collected. After the reaction was complete, excess mercapto acid was neutralized with sodium bicarbonate. The solvent was then removed under vacuum to yield the multi-reactivity polymercaptan core.

The results of $^{13}C$ NMR shows 5 peaks for the quaternary carbon of the pentaerythritol esters at chemical shift 42 ppm, which indicates a perfect statistical distribution of the expected five products from the reaction of pentaerythritol with 2 moles of 3-mercaptopropionic acid and 2 moles of 2-mercaptopropionic acid (i.e., 0:4,1:3,2:2,3:1,4:0).

Example III

Preparation of 4-Armed Amphiphilic Star Polymer from a Tetra-Functional Core of Differential Reactivity A star polymer in accordance with the present invention was prepared in the following manner. Butyl methacrylate ("BMA"), 25 grams, and 6.5 grams bis(3-mercaptopropionate) bis(2-mercaptopropionate) pentaerythritol, prepared according to Example II, were added to 200 grams ethanol, stirred and heated to reflux, approximately 80° C. To the mixture, half of an initiator solution (1.0 g 2,2'-azobisisobutyronitrile ("AIBN") in 10 ml ethanol) was added. After approximately 90 minutes the heat was removed and 25 grams butyl acrylate ("BA") and 150 grams acrylic acid ("AA") along with the second half of the initiator solution were added. The mixture was stirred and heated for an additional two hours. To the mixture was added a sodium hydroxide solution prepared from 20 grams of sodium hydroxide in 200 ml of water. Following addition of the sodium hydroxide solution, more water is added to give a final mixture of 10% solids. The result is a clear solution of a heteroarm star polymer with a theoretical molecular weight of 15,000. The clarity of the solution is indicative of the absence of butyl methacrylate homopolymer and, thus, the formation of heteroarm polymer whereupon each star has arms of both butyl methacrylate and butyl acrylate-co-sodium acrylate. The solution was freeze dried to yield a white powder.

Example IV

Preparation of 4-Armed Amphiphilic Star Polymer from a Homocore

For comparison, a star polymer was prepared from a non-multiple reactivity core in the following manner: Butyl methacrylate, 25 grams, and 6.5 grams pentaerythritol tetrakis(3-mercaptopropionate) were added to 200 grams ethanol, stirred and heated to reflux, approximately 80° C. To the mixture, half of an initiator solution (1.0 g azobisisobutyronitrile [AIBN] in 10 ml ethanol) was added. After approximately 90 minutes the heat was removed and 25 grams butyl acrylate and 150 grams acrylic acid along with the second half of the initiator solution were added. The mixture was stirred and heated for an additional two hours. To the mixture was added a sodium hydroxide solution prepared from 20 grams of sodium hydroxide in 200 mls of water. Following addition of the sodium hydroxide solution, more water is added to give a final mixture of 10% solids. The result was a slightly turbid solution/suspension of a heteroarm star polymer with a theoretical molecular weight of 15,000. The very slight turbidity observed may indicate the presence of some butyl methacrylate homopolymer which is insoluble in water.

To avoid the formation of a turbid solution, the above process was repeated with process but very careful control of the level of conversion with butyl methacrylate, before addition of the butyl acrylate/acrylic acid. In the above reaction sequence, when the first polymerization step was allowed to proceed only 70 minutes, instead of 90 minutes, a clear solution was obtained.

However, for star formation utilizing the multi-reactivity core (as in Example III) control of the processing parameters, such as the time allowed for conversion of the first monomer, are not so critical. This is because, on average, the multiple thiol cores have two thiol terminated arms that are relatively unreactive (secondary thiol) and two thiol terminated arms that are relatively reactive (primary thiol). The less reactive thiols will tend only to react when the second step monomer is added and the reaction allowed to proceed for the two hours. This ensures that all stars formed will contain both monomers in a blocky form.

Example V

Other representative amphiphilic polymers were prepared according to Examples III and IV. The Ingredients used are shown below in Tables I, II and III.

The time indicated in the tables is delay time, if any, between addition of the first monomer(s) (in this case BMA) and the second monomer(s) (in this case BA and AA).

TABLE I

Low Molecular Weight Polymers

|   | 5A | 5B | 5C | 5D | 5E | 5F |
|---|---|---|---|---|---|---|
| BMA | 12.5 | 12.5 | 12.5 | 12.5 | 12.5 | 12.5 |
| BA | 12.5 | 12.5 | 12.5 | 12.5 | 12.5 | 12.5 |
| AA | 75 | 75 | 75 | 75 | 75 | 75 |
| ethanol | 100 | 100 | 100 | 100 | 100 | 100 |
| AIBN | 0.5 | 0.5 | 0.5 | 0.5 | 0.5 | 0.5 |
| 4-arm homocore | 4.0 | 4.0 | 4.0 | 4.0 | 4.0 | 4.0 |
| NaOH | 10 | 10 | 10 | 10 | 10 | 10 |
| $H_2O$ | 100 | 100 | 100 | 100 | 100 | 100 |
| time, min | 90 | 90 | 45 | 30 | 15 | 0 |
| % solids | 17.5 | 18.6 | 17.5 | 17.5 | 16.4 | 17.0 |
| pH | 9.5 | 9.5 | 9.5 | 9.5 | 9.5 | 9.5 |

TABLE II

High Molecular Weight Polymers

|   | 5G | 5H | 5I |
|---|---|---|---|
| BMA | 12.5 | 12.5 | 12.5 |
| BA | 12.5 | 12.5 | 12.5 |
| AA | 75 | 75 | 75 |
| ethanol | 100 | 100 | 100 |
| AIBN | 0.5 | 0.5 | 0.5 |
| 4-arm homocore | 2.5 | 2.5 | 2.5 |
| NaOH | 10 | 10 | 10 |
| $H_2O$ | 100 | 100 | 100 |
| time, min | 45 | 15 | 0 |
| % solids | 17.5 | 18.6 | 17.5 |
| pH | 9.5 | 9.5 | 9.5 |

TABLE III

Heterocore Polymers

|   | 5J | 5K | 5L | 5M |
|---|---|---|---|---|
| BMA | 12.5 | 12.5 | 12.5 | 12.5 |
| BA | 12.5 | 12.5 | 12.5 | 12.5 |
| AA | 75 | 75 | 75 | 75 |
| ethanol | 100 | 100 | 100 | 100 |
| AIBN | 0.5 | 0.5 | 0.5 | 0.5 |
| 4-arm homocore | 4.0 | 4.0 | 4.0 | 4.0 |
| NaOH | 10 | 10 | 10 | 10 |
| $H_2O$ | 100 | 100 | 100 | 100 |
| time, min | 90 | 60 | 15 | 0 |
| % solids | 17.5 | 18.6 | 17.5 | 17.5 |

Example VI

The following example is exemplary of an amphiphilic heteroarm star polymer stabilized aqueous emulsion composition.

A star polymer, 74 grams, prepared according to Example IV (90 minute polymerization), was dissolved into water and mixed, followed by charging with subsurface $N_2$ purge for 30 minutes. Agitation was increased to 200 rpm. Methyl methacrylate, 13.5 grams and 9 grams butyl acrylate were added and heated to 60° C. Deionized water, 5 grams, and 0.15 grams ammonium persulphate were added and heated during initiation to 77° C. At 78° C., the mix was held for ten minutes then 51 grams methyl methacrylate and 76.5 grams butyl acrylate were added at a 3 hr rate. In a separate slow add, 0.45 grams ammonium persulphate and 0.125 grams 30% $NH_4OH$ were added at a 3 hr rate. Temperature was maintained at 77 to 79° C. while pH maintained above 7 with 10% $NH_4OH$ solution. The mix was held for 15 to 60 minutes then cooled to 60° C., and 5 grams of water and 0.15 grams sodium metabisulfate were added in at 60° C. After five minutes 0.15 grams t-butyl hydroperoxide and 5 grams of water were added and cool to 30° C. The following chart illustrates the monomers used:

| MATERIAL | RUN mass (g) | PARTS (% M) |   |
|---|---|---|---|
| DI Water | 165.5 |   | IC1 |
| Star Polymer 17.4% | 74 | 8.7 |   |
| Methyl Methacrylate | 13.5 | 9 | IC2 |
| Butyl Acrylate | 9 | 6 |   |
| DI Water | 5 |   | IC3 |
| Ammonium Persulphate | 0.15 | 0.1 |   |
| Methyl Methacrylate | 51 | 34 | SA1 |
| Butyl Acrylate | 76.5 | 51 |   |
| DI Water | 12.5 |   | SA2 |
| Ammonium Persulphate | 0.45 | 0.30 |   |
| $NH_4OH$ (30%) | 0.125 | 0.08 |   |
| DI Water | 5 |   | PA1 |
| t-butyl hydroperoxide | 0.15 | 0.00 |   |
| DI Water | 5 |   | PA2 |
| Sodium Metabisulfite | 0.15 | 0.00 |   |
| Total Water | 260.5 |   |   |
| Total Monomer | 150 |   |   |
| Total Emulsifer | 75 |   |   |
| Total Oxidizer | 0.75 |   |   |
| Total Reducer | 0.15 |   |   |
| Final 'Theoretical' % Solids | 39.1 |   |   |

The surface tension of water star polymer solutions was measured using a bubble tensionmeter and the results shown below:

| weight concentration of star polymer | equilibrium surface tension (dynes/cm) |
|---|---|
| 0 | 72 |
| 1 | 69.5 |
| 2 | 68.4 |
| 4 | 66 |
| 6 | 60.8 |
| 8 | 60 |
| 10 | 55.9 |
| 17.4 | 57.2 |

Example VII

A hetero-core star polymer was prepared according to Example III above, from a mixture of acrylates in the ratio of 57.5 parts 2-ethylhexyl acrylate, 12.5 butyl methacrylate and 30 parts acrylic acid polymerized in the prescence of 4 parts tetrafunctional polymercaptan pentaerythritol bis(2-mercaptopropionate) bis(3-mercaptopropionate).

| Ingredient | Monomer (parts per hundred) |
|---|---|
| Water |   |
| (Hetero-core 12.5% BMA/57.52-EHA/30% AA) | 10.1 |
| Methyl Methacrylate | 5 |
| Butyl Acrylate | 95 |
| Ammonium Persulphate | 0.35 |
| Ammonium Hydroxide (30% solution) | 0.074 |
| t-Butyl Hydroperoxide (70% solution) | 0.09 |

-continued

| Ingredient | Monomer (parts per hundred) |
|---|---|
| Sodium Formaldehyde Sulfoxylate | 0.09 |
| Theoretical Solids Content = | 40.8% |
| Final Solids (Measured) = | 40.8% |
| Brookfield Viscosity = | 36 cps |
| pH = | 7.34 |
| Average Particle Size = | 403 nm |

Acrylic emulsion polymerization preparation.

For the following procedure, the above ingredients and amounts were used. Water and heterocore star polymer were charged to a 2L round bottom flask equipped with an overhead condenser and stirrer, and the pH was adjusted to pH=8 in order to dissolve the star polymer. The mixture was heated to 60° C. while purging with nitrogen. An initial monomer charge (8.2% of total monomer) was added to the vessel. An initial ammonium persulphate charge (25% of total ammonium persulphate) was subsequently added to the vessel. The exotherm and change in color associated with the initiation stage was observed. The reaction contents were heated to 75° C. at which time the remaining monomer and ammonium persulphate and the ammonium hydroxide were slow added to the reactor at a 3 hour rate. After slow adds were complete, the reactor contents were cooled to 60° C. at which point solutions of t-butyl hydroperoxide and sodium formaldehyde sulfoxylate were added consecutively. The temperature was held at 60° C. for 30 minutes, then the reactor contents cooled to room temperature and discharged.

Example VIII

Emulsion Polymerization: Flexible Laminating Adhesive Base Resin

| Ingredient | Monomer (parts per hundred) |
|---|---|
| Water | |
| Aerosol MA | 0.09 |
| Ammonium Persulphate 10265-51 | 1.7 |
| (Hetero-core 12.5% BMA/12.5BA/75% AA) | 5.71 |
| Vinyl Acetate | 20 |
| Butyl Acrylate | 80 |
| t-Butyl Hydroperoxide (70% solution) | 0.15 |
| Sodium Formaldehyde Sulfoxylate | 0.15 |
| Ammonium Hydroxide (30% solution) | 0.03 |
| Theoretical Solids Content = | 42.4% |
| Final Solids (Measured) = | 42.6% |
| Brookfield Viscosity = | 24 cps |
| pH= | 5.48 |
| Average Particle Size = | 405 nm |

The initial charge consisted of water. A second charge consisted of Aerosol MA, a sodium dihexyl sulfosuccinate available from Cytec and ammonium persulphate. The initial charge was charged to a 2L round bottom flask equipped with an overhead condenser and stirrer, then purged with nitrogen for 30 to 45 minutes. The nitrogen purge was then raised and the mixture heated to 68 to 70° C. At 70° C. the second charge is added to the vessel and the contents heated to 80° C. A pre-emulsion consisting of water, star polymer, according to Example III and monomer was generated. The pH of which was adjusted to 5 using ammonium hydroxide. The pre-emulsion is added at a 2 hour rate starting at 70° C. After the pre-emulsion slow add is complete, the reactor contents were held at 80° C. for 15 minutes, followed by cooling the reactor contents to 60° C. and adding t-butyl hydroperoxide solution. Then over 30 minutes, sodium formaldehyde sulfoxylate solution was slowly added while maintaining a temperature 60° C. The mixture was then cooled to room temperature and discharged.

Example IX

Emulsion Polymerization: Model Flexible Laminating Adhesive Base Resin. The same procedure as that described above with Example VIII was used.

| Ingredient | Monomer (parts per hundred) |
|---|---|
| Water | |
| Aerosol MA | 0.09 |
| Ammonium Persulphate | 1.7 |
| (Hetero-core 12.5% BMA/37.52-EHA/50% AA) | 5 |
| Vinyl Acetate | 20 |
| Butyl Acrylate | 80 |
| t-Butyl Hydroperoxide (70% solution) | 0.15 |
| Sodium Formaldehyde Sulfoxylate | 0.15 |
| Ammonium Hydroxide (30% solution) | 0.03 |
| Theoretical Solids Content = | 42.4% |
| Final Solids (Measured) = | 41.9% |
| Brookfield Viscosity = | 20 cps |
| pH = | 5.94 |
| Average Particle Size = | 485 nm |

We claim:

1. A amphiphilic heteroarm star polymer stabilized aqueous emulsion composition comprising (a) from about 10% to 80% by weight of a polymer derived from an emulsion polymerizable ethylenically unsaturated monomer or monomers; (b) from about 0.1 to 20% by weight of an amphiphilic heteroarm star polymer; (c) from about 0.01% to 1% by weight of a free radical polymerization initiating agent; and (d) the remainder water and optionally a buffering agent, wherein the heteroarm star polymer comprises a mercaptan core and one or more compatible vinyl monomers wherein the core is of the general formula:

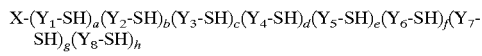

$$X\text{-}(Y_1\text{-}SH)_a(Y_2\text{-}SH)_b(Y_3\text{-}SH)_c(Y_4\text{-}SH)_d(Y_5\text{-}SH)_e(Y_6\text{-}SH)_f(Y_7\text{-}SH)_g(Y_8\text{-}SH)_h$$

wherein X is derived from an organic radical having a valence of 3–8; $Y_1$, $Y_2$, $Y_3$, $Y_4$, $Y_5$, $Y_6$, $Y_7$ and $Y_8$ are the same or different and each comprise $C_{2\text{-}10}$ alkanoic acids where a, b, c, d, e, f, g, h are integers from 0–8, provided that $3 \leq a+b+c+d+e+f+g+h \leq 8$; and at least one of the compatible vinyl monomers comprise a functional group selected from the group consisting of hydroxyl, amine, carboxylic acid or amide group.

2. An emulsion according to claim 1 wherein the emulsion polymerizable ethylenically unsaturated monomers are selected from the group consisting of vinyl ester monomers, vinyl acetate, vinyl propionate, vinyl neononanoate, vinyl neodecanate, vinyl 2-ethylhexanoate, vinyl pivalate, vinyl versatate, alkyl (meth)acrylate monomers, methyl acrylate, ethyl acrylate, butyl acrylate, 2-ethylhexyl acrylate, lauryl acrylate, methyl methacrylate, monoethylenically unsaturated carboxylic acid monomers, acrylic acid, methacrylic acid, itaconic acid, crotonic acid, fumaric acid, maleic anhydride, styrene, butadiene, acrylonitrile, acrylamide, N-methylol acrylamide, dibutyl maleate, ethylene, vinyl chloride and mixtures thereof.

3. An emulsion according to claim 1 wherein a and b are integers from 1 to 8, and c, d, e, f, g, h are integers from 0 to 8, provided that a+b+c+d+e+f+g+h≦8.

4. An emulsion according to claim 1 wherein b=c=d=e=f=g=h=0.

5. An emulsion according to claim 1 wherein the compatible vinyl monomers are selected from the group consisting of the esters and amides of acrylic and methacrylic acids with alcohols, phenols and amines; the vinyl aromatic compounds, and substituted derivatives thereof; vinyl esters; vinyl amides, ethylenically unsaturated nitriles, hydroxyalkyl esters of ethylenically unsaturated carboxylic acids, ethylenically unsaturated carboxylic acids, ethylenically unsaturated epoxides, ethylenically unsaturated isocyanates, ethylene glycol di(meth)acrylate, trimethylolpropane tri(meth)acrylate, diethylene glycol di(meth)acrylate, divinyl benzene, triallyl cyanurate, allyl acrylate, diallyl phthalate, diallyl sucrose and combinations thereof.

* * * * *